United States Patent [19]

Henning et al.

[11] Patent Number: 5,303,253

[45] Date of Patent: Apr. 12, 1994

[54] FLOWING GAS LASER

[75] Inventors: Hans-Heinrich Henning, Ennepetal; Bernd Ellinghaus; Frank Diedrichsen, both of Wuppertal; Walter Winkelströter; Dieter Frohn, both of Wuppertal, all of Fed. Rep. of Germany

[73] Assignee: Gebr. Becker GmbH & Co., Wuppertal, Fed. Rep. of Germany

[21] Appl. No.: 894,400

[22] Filed: Jun. 5, 1992

[30] Foreign Application Priority Data

Jun. 7, 1991 [DE] Fed. Rep. of Germany ....... 4118786

[51] Int. Cl.$^5$ ............................................. H01S 3/22
[52] U.S. Cl. ........................................ 372/58; 372/35; 372/59; 372/92
[58] Field of Search ................ 372/58, 59, 55, 92, 372/34, 35

[56] References Cited

U.S. PATENT DOCUMENTS

| | | | |
|---|---|---|---|
| 3,634,778 | 1/1972 | Melikian | 331/94.5 |
| 4,089,176 | 5/1978 | Ashe | 60/650 |
| 4,686,680 | 8/1987 | Hoag | 372/58 |
| 4,817,111 | 3/1989 | Nilsen et al. | 372/58 |
| 4,984,245 | 1/1991 | Karube | 372/59 |
| 5,060,238 | 10/1991 | Karube et al. | 372/58 |
| 5,124,997 | 6/1992 | Funakubo et al. | 372/58 |

FOREIGN PATENT DOCUMENTS 338108 6/1921 Fed. Rep. of Germany .
3801481 8/1988 Fed. Rep. of Germany .

*Primary Examiner*—Léon Scott, Jr.
*Attorney, Agent, or Firm*—Darby & Darby

[57] ABSTRACT

A compact flowing gas laser, particularly a $CO_2$ gas laser, wherein the path or paths between the outlet or outlets and the inlet or inlets of one or more optical resonators contain a turbine whose impeller or impellers are driven by heated gas and which drives the impeller or impellers of a rotor forming part of a compressor serving to compress the thus cooled and expanded gaseous lasing medium prior to reentry into the resonator or resonators. A first heat exchanger is installed between the turbine and the compressor, and a second heat exchanger is provided downstream of the compressor.

50 Claims, 2 Drawing Sheets

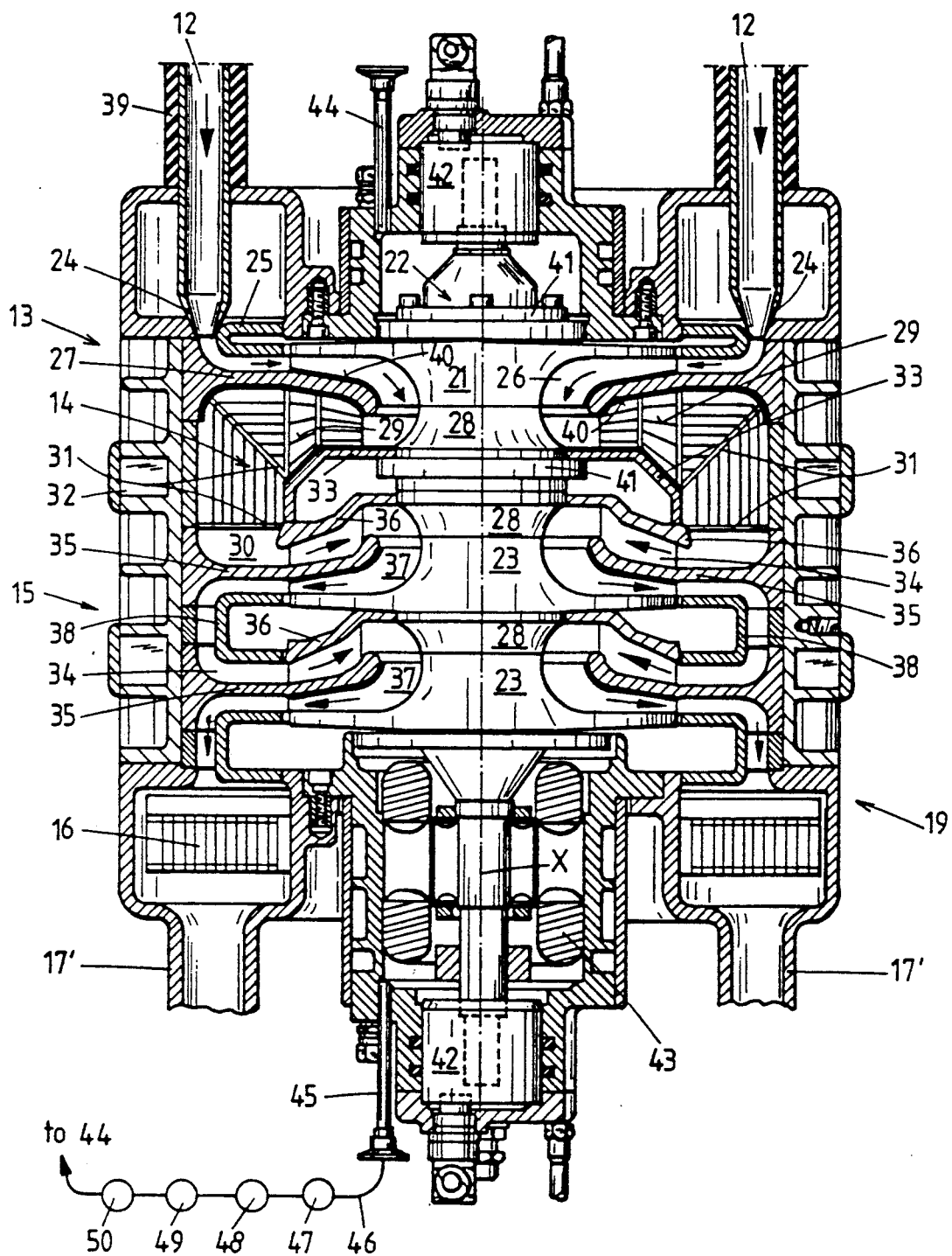

FLOWING GAS LASER

BACKGROUND OF THE INVENTION

The invention relates to gas lasers in general, and more particularly to improvements in flowing gas lasers, such as axial flow $CO_2$ lasers. Still more particularly, the invention relates to improvements in gas lasers of the type disclosed in commonly owned copending German patent application Serial No. 38 01 481 published Aug. 4, 1988.

The copending German patent application discloses a gas laser with an optical resonator and conduits connecting the gas-discharging outlet to the inlet of the resonator. The conduits cause the gas to pass through a compressor and a heat exchanger. An advantage of such laser is its compactness.

The trend in the development of gas lasers, particularly $CO_2$ lasers, is toward higher outputs. The efficiency of presently known gas lasers is relatively low, especially the so-called plug efficiency which is intended to denote the ratio of achieved light output to current consumption.

U.S. Pat. No. 4,089,176 granted May 16, 1978 to Ashe for "Heat Storage Method and Apparatus" discloses a method of and an apparatus for operating power turbomachinery. A graphite heat storage core is employed to heat compressed gaseous fluid for subsequent expansion across a fluid turbine in order to generate rotary mechanical power output. FIG. 1 of the patent shows a radial compressor which supplies gaseous fluid to a noncombusting heat storage element or apparatus by way of a heat exchanger and a conduit. The heat storage element or apparatus supplies compressed gaseous fluid to a turbine by way of a conduit, and the turbine is driven to transmit torque to the rotary component or components of the compressor. The rotary component or components of the turbine are connected with the rotary component or components of the compressor by a rigid shaft. The shaft extends beyond the turbine and serves to transmit torque to a driven part, such as the propeller of a torpedo. Gas which has undergone expansion in the turbine is returned to the compressor by way of the heat exchanger. The patent to Ashe does not discuss a laser.

German Pat. No. 338108 granted Jun. 14, 1921 to Kasparek discloses a combination of a blower and a turbine. The low-pressure unit of the apparatus is connected with a high-pressure impeller assembly and comprises four stages. Air which is drawn through the intake of the apparatus passes through the four stages to an outlet and thence to the first stage of the high-pressure impeller assembly. The thus compressed air is discharged or is admitted to the inlet of the turbine proper. The purpose of the patented apparatus is to drive the compressor at a maximum speed. Compressed air is used up, either entirely or in part, and the unused part is conveyed to and serves to drive the turbine wheel. This patent fails to mention a laser for obvious reasons.

A conventional flowing gas laser is disclosed in U.S. Pat. No. 4,686,680 granted Aug. 11, 1987 to Hoag et al.

U.S. Pat. No. 3,634,778 granted Jan. 11, 1972 to Melikian et al. discloses a closed-cycle gas laser system with a first turbine downstream of two heat exchangers which cool the gas issuing from the laser, and with a second turbine immediately upstream of the gas inlet of the laser. The second turbine is used for generation of electric current, and the first turbine is used to compress the gas.

OBJECTS OF THE INVENTION

An object of the invention is to provide a gas laser which operates with a higher degree of efficiency than heretofore known lasers.

Another object of the invention is to provide a flowing gas laser with novel and improved means for driving the compressor for the gaseous lasing medium.

A further object of the invention is to provide a novel and improved system for circulation of gas, such as $CO_2$ gas, in a flowing gas laser.

An additional object of the invention is to provide a compact flowing gas laser whose energy consumption is lower than that of heretofore known flowing gas lasers.

Still another object of the invention is to reduce the resistance to the flow of gas in a flowing gas laser.

A further object of the invention is to provide novel and improved means for driving a compressor in a flowing gas laser.

An additional object of the invention is to provide a flowing gas laser with a novel system of heat exchangers.

Another object of the invention is to provide a novel and improved system for preventing overheating of the bearings for the rotary component or components of the compressor in a flowing gas laser.

Still another object of the invention is to provide novel and improved means for confining the gas in a flowing gas laser to the flow along one or more prescribed paths.

A further object of the invention is to provide a novel and improved method of recovering energy from the gas which is circulated in a flowing gas laser.

An additional object of the invention is to provide novel and improved combination of compressor and heat exchangers for use in the above outlined laser.

Another object of the invention is to provide a simple, compact and inexpensive laser which is constructed and assembled in such a way that the ratio of obtained light output to current consumption is more satisfactory than in conventional fluid flow lasers.

Still another object of the invention is to provide a novel and improved axial flow $CO_2$ laser.

SUMMARY OF THE INVENTION

The invention is embodied in a flowing gas laser which comprises gas discharge means including at least one optical resonator having an inlet for admission of cooled gas (such as $CO_2$ gas) and an outlet for energy-bearing heated gas, gas confining means defining at least one path for the flow of gas from the outlet to the inlet, a turbine provided in the confining means and comprising at least one rotary impeller which is driven by the energy-bearing gas with attendant cooling and expansion of the gas, and a compressor which is driven (at least in part) by the at least one impeller of the turbine and is installed in the confining means downstream of the turbine to compress the cooled gas.

The compressor can comprise a radial blower having a rotor with at least one impeller, and such laser further comprises means (e.g., a shaft which can be said to constitute a component part of the turbine or a component part of the compressor) for transmitting torque from the at least one impeller of the turbine to the rotor.

At least one heat exchanger is provided in the confining means to exchange heat with the gas downstream of the turbine and/or downstream of the compressor and/or at the rotor of the compressor.

The confining means can comprise at least one conduit which serves to convey heated has from the outlet to the turbine.

The gas discharge means can comprise n resonators and the confining means can comprise m conduits. The number (m) of conduits at most equals the number (n) of resonators.

The cross-sectional area of the at least one conduit is preferably selected in such a way that it at most matches the cross-sectional area of the respective outlet. Such cross-sectional areas are or can be circular cross-sectional areas; the diameter of the at least one conduit then at most matches the diameter of the respective outlet.

The cross-sectional area of the at least one conduit can decrease in the direction of gas flow from the resonator torard the turbine, and the largest portion of such cross-sectional area at most matches the cross-sectional area of the respective outlet.

The at least one conduit can define an at least one substantially straight portion of the at least one path to offer little resistance to the flow of heated gas from the respective resonator to the turbine.

The confining means can further comprise at least one gas accelerating nozzle between the at least one conduit and the at least one impeller of the turbine. If the confining means comprises a plurality of conduits which convey heated gas from the respective resonators to the turbine, such confining means can further comprise an annulus of gas accelerating nozzles between the conduits and the at least one impeller of the turbine.

The axis of the entire at least one conduit, or at least of the discharge end of such conduit, is or can be parallel to the axis of rotation of the at least one impeller of the turbine. Alternatively, either the axis of the entire at least one conduit, or at least the axis of the discharge end of such at least one conduit, can extend substantially radially of the axis of rotation of the at least one impeller of the turbine.

The turbine can be a constant-pressure turbine or a reaction turbine.

The compressor can comprise a radial blower with a rotor having one or more rotary impellers which are coaxial with the at least one impeller of the turbine.

The at least one heat exchanger can be provided in the confining means between the impeller or impellers of the rotor and the at least one impeller of the turbine. Such heat exchanger can include or constitute a diffusor between the at least one impeller of the turbine and the first impeller of the rotor.

The confining means can comprise a casing for the compressor, and the at least one impeller of the turbine can be installed in such casing. The aforementioned heat exchanger (such as a diffusor) can be installed in the casing of the compressor between the compressor and the turbine. Such heat exchanger can comprise at least one substantially frustoconical gas guiding element which diverges in the direction of gas flow from the turbine toward the compressor. It is presently preferred to provide the heat exchanger with a succession of frustoconical gas guiding elements and with at least one pipe for the circulation of a liquid coolant (e.g., water). The pipe connects the gas guiding elements with each other. The just discussed heat exchanger can be a modular structure which is assembled of several sections; for example, such sections can include two shells.

The laser can further comprise a thermal insulator (e.g., an external jacket) for the at least one conduit between the outlet of the respective optical resonator and the casing for the compressor.

The turbine can include a wall which is adjacent the heat exchanger between the turbine and the compressor, and the laser can further comprise at least one layer of thermal insulating material between the wall and the heat exchanger.

The heat exchanger which is installed between the turbine and the compressor can be positioned adjacent the nozzle of the at least one conduit which conveys heated gas from the outlet of the respective resonator to the turbine, and the laser then preferably further comprises at least one layer of thermal insulating material between the nozzle and the heat exchanger.

The laser can further comprise a liquid-containing cooling unit (e.g., a jacket for the circulation of water) for the casing of the compressor, and such cooling unit can be installed adjacent the heat exchanger between the turbine and the compressor. If the rotor of the compressor comprises a plurality of stages, the liquid-containing cooling unit for the casing of the compressor can be installed between two stages of the compressor. The just discussed liquid-containing cooling unit can be connected with the pipe or pipes of the aforediscussed heat exchanger which is disposed between the turbine and the compressor and comprises one or more preferably frustoconical gas guiding elements.

The aforementioned shaft can carry heat insulating members; for example, the at least one impeller of the turbine can be disposed between two heat insulating members. Such heat insulating members can be made of or can contain a ceramic material.

A bearing for the shaft can be installed in the casing for the turbine and/or compressor, and such bearing can be adjacent the turbine. The laser can further comprise means for admitting fresh gas (e.g., $CO_2$ gas) from a suitable source into the at least one path in the region of the bearing. A second bearing for the shaft can be provided in the casing adjacent the compressor, and the laser can further comprise means for evacuating some spent gas from the at least one path in the region of the second bearing and conduit means connecting the evacuating means with the admitting means. The laser can further comprise one or more gas filters and/or one or more gas cooling means and/or one or more additional gas cleaning means and/or one or more flow restrictors in the conduit means between the gas evacuating means and the gas admitting means.

At least one heat exchanger can be provided in the at least one path between the compressor and the inlet(s) of the resonator(s). Such heat exchanger can comprise a plurality of substantially annular heat exchanging elements which are coaxial with the rotor of the compressor. The heat exchanging elements of the just discussed heat exchanger can be installed adjacent the discharge end of the casing for the compressor.

If the gas discharge means of the improved gas laser comprises n resonators each having an inlet and an outlet, the confining means can comprise the aforementioned casing for the compressor and m conduits connecting the casing with the inlets of the resonators. The number (m) of conduits at most equals the number (n) of inlets. Portions of such m conduits can extend radially of or in parallelism with the axis of the rotor of the compressor in the casing of the confining means.

That portion (e.g., the aforediscussed at least one conduit) of the confining means which connects the outlet of a resonator with the casing for the turbine and/or compressor is preferably designed to offer little resistance to the flow of gas from the resonator to the turbine.

The axial length of the at least one impeller of the turbine (as measured axially of the aforementioned shaft) can equal or approximate the axial length of at least one impeller of the rotor forming part of the compressor.

Alternatively, the arrangement may be such that the quotient of the combined axial length of the at least one impeller of the turbine plus the heat exchanger between the turbine and the compressor, and the axial length of at least one impeller of the rotor of the compressor is a whole number.

The laser can comprise a first distancing member adjacent the at least one impeller of the turbine and a second distancing member adjacent at least one impeller of the rotor of the compressor. The quotient of the combined axial length of the first distancing member plus the at least one impeller of the turbine and the combined axial length of the second distancing member plus at least one impeller of the rotor of the compressor is preferably a whole number.

The novel features which are considered as characteristic of the invention are set forth in particular in the appended claims. The improved laser itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

FIG. 3 is an enlarged axial sectional view of the gas confining means in a laser which constitutes a slight modification of the laser of FIG. 2.

DESCRIPTION OF PREFERRED EMBODIMENTS

Figure 1:
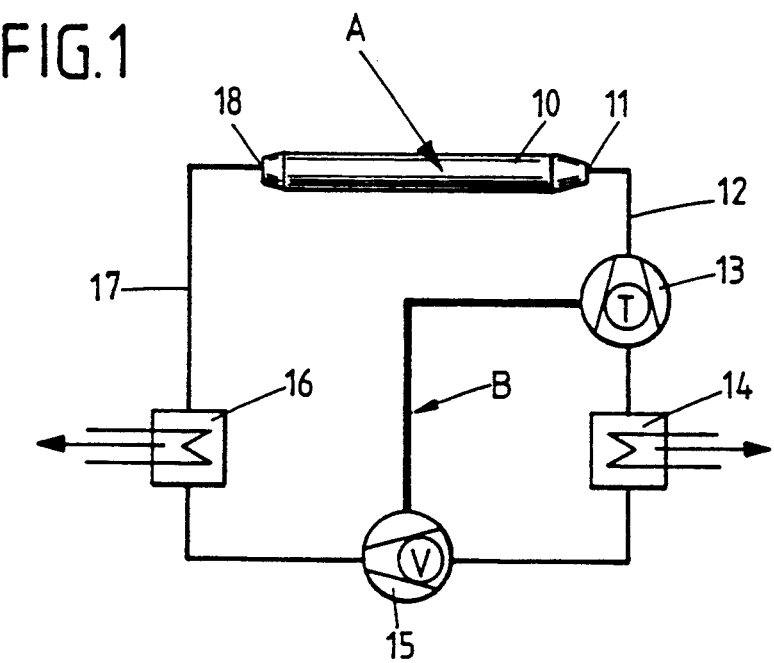
FIG. 1 is a schematic view of a flowing gas laser which embodies the invention and wherein the gas discharge means comprises a single optical resonator.

The laser which is shown in the drawing is an axial flow gas laser, for example, a $CO_2$ laser. The laser of FIG. 1 comprises gas discharge means with at least one optical resonator 10 having an inlet 18 for admission of cooled gas and an outlet 11 for energy-bearing heated gas. The means for confining a stream of gas to the flow along a predetermined path from the outlet 11 to the inlet 18 of the illustrated resonator 10 comprises a conduit 12 which receives heated gas from the outlet 11, and a conduit 17 which returns cooled and compressed gas into the inlet 18. The conduit 12 discharges energy-bearing heated gas against at least one rotary impeller 21 (FIG. 3) of a turbine 13 which is installed in the path defined by the gas confining means. The turbine 13 is followed (as seen in the direction of gas flow from the outlet 11 toward the inlet 18) by a first heat exchanger or precooler 14 which admits cooled gas into a compressor 15 (e.g., a radial blower) which is followed by a second heat exchanger or aftercooler 16. The latter admits cooled gaseous fluid into the conduit 17 for admission into the resonator 10 via inlet 18.

Figure 2:
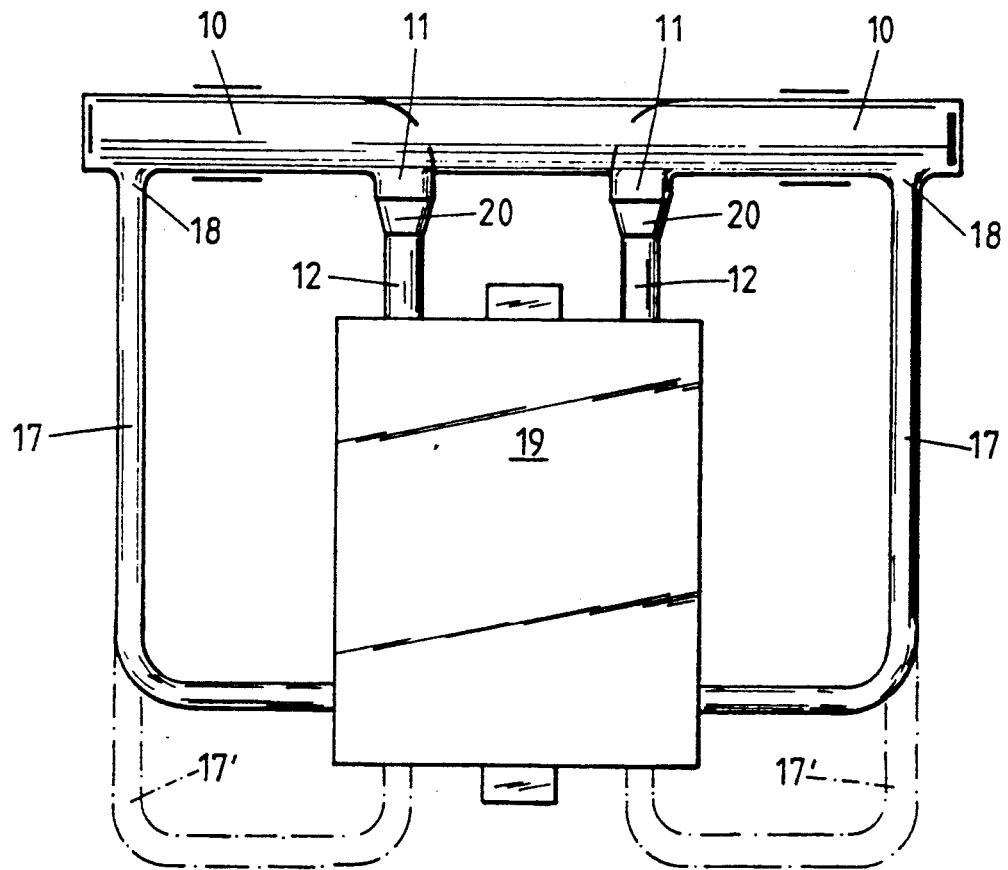
FIG. 2 is a schematic view of a modified laser with two resonators.

The exact construction of the gas discharge means including the illustrated optical resonator or resonators 10 shown in FIGS. 1 and 2 forms no part of the present invention. As indicated in FIG. 1 by an arrow A, each resonator 10 of FIGS. 1 and 2 can comprise a gas excitation system which raises the temperature of the gaseous lasing medium and causes a stream of such gas to leave the respective resonator 10 via outlet 11 and conduit 12 toward and to rotate the impeller 21 of the turbine 13. The turbine 13 enables the gas to expand and to dissipate some of the heat. The thus released energy is used to cause rotation of the rotor of the compressor 15 (this is indicated in FIG. 1 by arrow B). The gas is caused to undergo additional cooling and expansion during flow through the heat exchanger 14 prior to being compressed in the compressor 15. The heat which is generated as a result of compression of gas in the compressor 15 is withdrawn by the heat exchanger 16 which admits cooled gas into the conduit or conduits 17 for return flow into the inlet(s) of the respective resonator(s) 10. The thus recirculated gas is excited in the respective resonator or resonators 10 prior to being discharged through the corresponding outlet(s) 11.

In order to enhance the compactness of the improved laser while ensuring that the power output will be relatively high (e.g., 20 kilowatts), the means for confining the gas to the flow along at least one predetermined path further comprises a casing 19 (FIGS. 2 and 3) which is designed to accommodate the turbine 13, the compressor 15, the heat exchanger 14 between the turbine and the compressor, as well as the heat exchanger 16 between the compressor and the conduit(s) 17. The laser of FIGS. 2 and 3 comprises two discrete optical resonators 10, and the gas confining means of this laser comprises two conduits 12, a single casing 19 and two conduits 17. The conduits 12 (or at least those portions of the conduits 12 which are connected to the casing 19) are oriented in such a way that their axes are parallel to the axis of a shaft 22 for the impeller 21 of the turbine 13. On the other hand, those portions of the conduits 17 which receive compressed and cooled gas from the casing 19 extend at least substantially radially of the axis X of the shaft 22 (FIG. 2). As shown in FIG. 3 (and as also shown in FIG. 2 by phantom lines), those portions of the conduits 17' which receive compressed and cooled gas from the casing 19 can extend in parallelism with the axis of the shaft 22.

It is preferred to design the conduits 12 in such way that each such conduit comprises a portion 20 (FIG. 2) whose cross-sectional area diminishes in the direction of gas flow from the respective outlet 11 toward the impeller 21 of the turbine 13. This enhances the flow of gas into the turbine 13 by accelerating the gas on its way from the respective resonator 10 toward the impeller 21. The intake end of each conduit 12 has a cross-sectional area which at most equals the cross-sectional area of the respective outlet 11. Thus, if the conduits 12 and the outlets 11 have circular outlines, the maximum diameters of the portions 20 of conduits 12 at most equal the diameters of the corresponding outlets 11.

Referring now in greater detail to FIG. 3, the shaft 22 which is driven by the impeller 21 of the turbine 13 is coaxial with a multistage rotor forming part of the compressor 15 and including two coaxial impellers 23 driven by the shaft 22. As already mentioned above, the turbine 13, the compressor 15 (here shown as a radial blower) and the heat exchangers 14, 16 are installed in the casing 19 which forms part of the aforementioned gas confining means (such gas confining means further includes the conduits 12 and the conduits 17'). The compressor 15 is or can be identical with that which is described and shown in the aforementioned commonly owned German patent application Ser. No. 38 01 481 published Aug. 4, 1988. The dimensions of the turbine 13 and/or of the heat exchanger 14 and/or 16 can be selected in such a way that they can replace one of the impellers 23 of the rotor of the compressor 15 and the associated ring-shaped distancing member 28.

The axis X is common to the shaft 22 and impellers 21, 23, 23. The impeller 21 is caused to rotate under the action of energy-bearing heated gas which is supplied by the conduits 12 in parallelism with the axis X. The number m of such conduits at most equals the number n of resonators 10. The arrangement is such that the conduits 12 (or at least the major parts of such conduits) are straight (FIG. 2) so that they offer relatively small resistance to the flow of gas from the outlets 11 into the casing 19 for the turbine 13, compressor 15 and heat exchangers 14, 16. Thus, those portions of the paths for admission of heated energy-bearing gas into the casing 19 which extend between such casing and the outlets 11 are preferably straight. Furthermore, at least the diameters of the discharge ends of the conduits 12 are selected in such a way that the cross-sectional areas of the paths for the flow of gas from the outlets 11 do not increase during the last stages of flow into the casing 19.

FIG. 3 shows that the discharge ends of the conduits 12 are provided with nozzles 24 which accelerate the respective streams of energy-bearing heated gaseous medium and directly confront the inlet end of the turbine 13. Such heated gaseous medium is guided by a fixed ring-shaped deflector 25 which directs the gaseous medium against the impeller 21 where the gaseous medium impinges upon the vanes 26. The resulting expansion and cooling of the gas entail rotation of the impeller 21 which rotates the shaft 22 and this shaft, in turn, drives the coaxial rotor (impellers 23) of the compressor 15.

The expansion chamber of the turbine 13 is adjacent a fixed cover or wall 27. The expanded and cooled gas flows from the impeller 21 through a first ring-shaped distancing member 28 and enters the heat exchanger 14. The heat exchanger 14 of FIG. 3 is a diffusor which comprises a succession of substantially frustoconical gas guiding elements 29 of sheet metal or other suitable material. The gas is cooled while flowing along two different portions of the guiding elements 29. Two additional portions of the heat exchanger 14 respectively comprise gas guiding elements which are disposed radially or nearly radially of the axis X and gas guiding elements which extend in parallelism with the axis X. The thus cooled gas is caused to enter a collecting chamber 30 which is provided in the casing 19 upstream of the compressor 15. The various groups of gas guiding elements (including the elements 29) of the heat exchanger 14 are connected to each other by pipes 31 which convey a liquid coolant (e.g., water). Such pipes serve the dual purpose of holding the gas guiding elements 29 of the heat exchanger 14 in predetermined positions relative to each other and of withdrawing heat from the heat exchanger 14. The pipes 31 communicate with a channel 32 of a liquid-containing cooling unit for the adjacent portion of the casing 19. The liquid coolant in the channel 32 of the cooling unit for the casing 19 can be water.

The distribution of guide elements (including the elements 29) of the heat exchanger 14 between the turbine 13 and the compressor 15 is preferably such that these guide elements do not offer pronounced resistance to the flow of gas through the heat exchanger 14. In order to simplify the assembly of the heat exchanger 14, the latter can be assembled of several sections or modules, e.g., of two shells which spacedly surround the shaft 22.

FIG. 3 further shows guide vanes or members 33 which are designed to seal the impeller 21 of the turbine 13 from the heat exchanger 14. Such guide members can be made of metallic sheet material.

The gas which gathers in the chamber 30 is evacuated by way of a ring-shaped channel 34 which is disposed between a disc 35 and a sheet metal guide 36. The channel 34 directs the flow of cooled gas against the first impeller 23 of the multistage rotor forming part of the compressor 15. An auxiliary rotor (not shown) can be installed in the casing 19 upstream of the first or foremost impeller 23. The vanes 37 of the first impeller 23 compress the gas in addition to compression by the aforementioned auxiliary rotor, and the thus compressed gas is conveyed by a ring-shaped deflector 38 to the second stage of the compressor 15 where the gas is compressed again prior to leaving the compressor on its way toward and into the heat exchanger 16. The latter is built into the outlet portion of the casing 19 for the compressor 15 and comprises a set of ring-shaped gas guiding elements which concentrically surround the shaft 22. The gas is cooled again prior to being admitted into the conduits 17' for return flow into the inlets 18 of the respective resonators 10.

The conduits 12 are provided with jackets 39 of thermal insulating material which extends to the turbine 13. Furthermore, layers 40 of heat insulating material are provided on the wall 27 between the turbine 13 and the heat exchanger 14. A disc-shaped member 41 of thermal insulating material is provided between the bearing for the upper end of the shaft 22 of FIG. 3 and the turbine 13. This member can be made, at least in part, of a suitable ceramic material. A similar member 41 is provided between the impeller 21 of the turbine 13 and the first impeller 23 of the rotor of the compressor 15.

The bearings for the two ends of the shaft 22 are confined in cartridges 42, and such bearings are lubricated with grease.

The aforedescribed thermal insulators serve to ensure that the heated gases issuing from the outlets 11 of the resonators 10 cannot dissipate heat, or do not dissipate excessive amounts of heat, upstream of the turbine 13. In addition, the thermal insulators shield the bearings for the shaft 22 as well as the impellers 21 and 23 from overheating.

The reference character 43 denotes in FIG. 3 an electric motor which can be operated to start the turbine 13 and the blower (compressor) 15. Furthermore, the motor 43 can be used to assist the heated lasing medium in rotating the impeller 21 and hence the shaft 22 and the impellers 23 when the laser is in actual use. At such time, the power output of the motor 43 can be below the maximum (nominal) value.

FIG. 3 further shows a pipe 45 which permits evacuation of a certain percentage of spent gas from the path or paths which are defined by the confining means including the casing 19 and the conduits 12 and 17 or 17'. The pipe 45 is adjacent the motor 43 and the lower cartridge 42 containing one of the bearings for the shaft 22. A similar pipe 44 is provided adjacent the cartridge 42 for the upper bearing of FIG. 3 to permit admission of a certain quantity of fresh gas (e.g., from a suitable source of $CO_2$ gas or from the pipe 45). The fresh gas which is admitted via pipe 44 simultaneously serves to cool the bearing in the adjacent cartridge 42.

A conduit 46 (shown schematically in FIG. 3) can be provided to connect the discharge end of the pipe 45 with the intake end (or with one intake) of the pipe 44. This conduit 46 can contain one or more filters 47, one or more cooling units 48, one or more additional cleaning units 49 and one or more flow restrictors 50. When the laser is in operation, the compressor 15 establishes a pressure differential which causes a certain percentage of gas to leave the confining means via pipe 45 and to flow in the conduit 46 toward the pipe 44. The filter or filters 47 and the other cleaning unit or units 49 cooperate to clean the gas which flows in the conduit 46 from the pipe 45 toward and into the pipe 44. The additional cleaning unit or units 49 can employ a suitable catalyst.

The improved laser can be operated in many different positions of the casing 19. Thus, the axis X can be vertical, horizontal or inclined to the vertical as well as to the horizontal.

The gas excitation system or systems A for the resonator(s) 10 can be connected with a source of direct current or with a source of high-frequency voltage. In the event of radial or axial orientation of the conduit(s) 12, it is possible to operate the laser at less than capacity.

An important advantage of the improved laser is its compactness. Moreover, the energy requirements of the compressor 15 are surprisingly small because the rotor of this compressor is driven, at least in part, by the turbine 13 which, in turn, is driven by heated gas issuing from the optical resonator(s) 10. The casing 19 of the gas confining means can store a substantial number of, if not all, essential components of the improved gas laser.

Another important advantage of the improved laser is that the energy of the gas can be utilized to drive the turbine 13 which, in turn, drives the compressor 15, either alone or with assistance from the prime mover 43. Thus, the improved laser renders it possible to recover a high percentage of energy which is converted into heat and flow energy. Depending on the selected design and efficiency of the turbine 13 and compressor 15, the turbine can supply between 50 and 90 percent of energy which is required to operate the compressor. For example, in the case of a 10 kilowatt laser, the provision of turbine 13 in the path(s) for the flow of gas from the outlet(s) 11 to the inlet(s) 18 of the resonator(s) 10 can result in power savings of between 15 and 26 kilowatt. Additional savings are achieved if the number (m) of conduits 12 is selected in such a way that it at most equals the number (n) of outlets 11, i.e., the number of resonators 10. This reduces losses due to the resistance to flow, and such losses can be reduced still further if the cross-sectional area of each outlet 11 at least equals the maximum cross-sectional area of the respective conduit 12. In addition, this prevents the development of abrupt surges of pressure at the outlet(s) 11 of the resonator(s) 10. The efficiency of the laser can be enhanced still further by resorting to the aforediscussed expedient of providing the conduits 12 with portions 20 whose diameters decrease in a direction from the respective resonators 10 toward the turbine 13. This increases the speed of the gas flowing toward the turbine 13 and the efficiency of the laser in actual use. As also mentioned hereinbefore, the resistance to the flow of circulating gas can be improved still further (to thus further enhance the efficiency of the laser) by ensuring that the conduit or conduits 12 are at least substantially straight, i.e., that such conduit or conduits do not cause any, or any pronounced, changes in the direction of flow of heated gas from the outlet(s) 11 to the turbine 13. If the number of conduits 12 is sufficient, their ends can be provided with nozzles 24 which jointly form an annulus to thus ensure even more efficient utilization of heated gas by guaranteeing that the turbine operates with a high degree of efficiency. If the number of conduits 12 is relatively small, they preferably extend in parallelism with the axis X of the shaft 22. However, if the number of conduits 12 is larger, at least their discharge ends can extend radially of the impeller 21 of the turbine 13. The latter preferably constitutes a reaction turbine if the number of conduits 12 is relatively large.

It is equally within the purview of the invention to provide one or more torque transmitting components between the shaft 22 of the impeller 21 and the impellers 23 of the compressor 15. The illustrated direct connection between the shaft 22 and the impellers 23 is preferred at this time because this ensures that the energy which is recovered from flowing gas by the turbine 13 is used to rotate the impellers 23 without the interposition of any additional parts which would result in lower efficiency of the torque transmitting connection including the shaft 22. In addition, the illustrated design contributes to compactness of the casing 19 and of the entire laser.

The heat exchanger 14 need not constitute a diffusor. However, such heat exchanger is preferred at this time because it also contributes to efficiency of the laser in that it ensures adequate cooling of the gas between the turbine 13 and the compressor 15 without causing pronounced pressure loss. This is due to the fact that the kinetic energy of the gas is converted into pressure so that the pressure differential at the turbine 13 is even increased.

The utilization of a turbine in the path for the flow of gas toward the compressor brings about the additional advantage that the turbine contributes to pronounced cooling of the gas due to expansion. Thus, it is possible to employ a relatively small heat exchanger 14 because a relatively high percentage of cooling action takes place as a result of expansion of the gas in the turbine 13. The placing of the turbine 15 and/or of the heat exchanger 14 directly into the casing 19 of the compressor 15 also contributes to compactness of the improved laser.

The gas guiding elements 29 of the heat exchanger 14 ensure adequate cooling of the gas without the development of turbulence. The remaining velocity energy can be transformed to thereby reduce the pressure downstream of the turbine 13 by one or more additional millibar, especially if the means for removing heat from the gas guiding elements 29 employs the aforementioned liquid-circulating pipe or pipes 31. The members 29 can be made of a material (such as copper or aluminum) which is a satisfactory conductor of heat. The establishment of communication between the pipe or pipes 31 and the cooling unit 32 for the casing 19 contributes to simplicity and compactness of the apparatus.

The placing of the pipe 44 into close or immediate proximity of the respective cartridge 42 ensures adequate cooling of the respective bearing for the shaft 22 even though such bearing is installed in immediate or close proximity to the turbine 13 which receives heated gas from the conduit or conduits 12.

The conduit 46 renders it possible to use one and the same quantity of gas for extended periods of time. Thus, a $CO_2$ gas can be adequately cleaned and cooled and its flow can be regulated on the way from the pipe 45 to the pipe 44 and hence back into the path or paths for the flow of gas from the outlet(s) 11 to the inlet(s) 18. In addition, placing of the pipe 44 into close or immediate proximity to the respective cartridge 42 ensures satisfactory cooling of the bearing for the respective end of the shaft 22 so that such bearing can be lubricated by grease.

The heat exchanger 16 is preferably designed to ensure the establishment of a laminar gas flow from the compressor 15 toward and into the conduit(s) 17 or 17'. Such laminar flow can be established by utilizing the aforediscussed annular gas guiding members which are shown in the lower portion of FIG. 3 and are concentric with the shaft 22.

The exact distribution of conduits 17 or 17' (radially or axially of the compressor 15) will depend on the design of the selected compressor 15 and is selected with a view to ensure satisfactory flow of gas to the inlet(s) 18 with minimal pressure losses. As already mentioned hereinabove, the number (m) of conduits 17 or 17' should at most equal the number (n) of inlets 18.

The diameter of the impeller 21 can be smaller than the diameters of the impellers 23. This ensures that, when the improved laser is in actual use and the impellers 21 and 23 are rotated at a constant speed, the output of the turbine 13 matches that which is recovered as a result of expansion and cooling of gas flowing from the conduit(s) 12 to the heat exchanger 14. The amount of recovered energy is especially satisfactory if the resistance to the flow of gas from the outlet(s) 11 to the turbine 13 is as low as possible.

In accordance with a presently preferred embodiment which utilizes a compressor in the form of a multi-stage blower with a rotor having at least two coaxial impellers 23 (as disclosed in the aforementioned commonly owned copending German patent application Serial No. 38 01 481) and wherein the compressor and/or the casing therefor is assembled of two or more modules, the axial length of the impeller 21 preferably equals or approximates the axial length of the one or the other impeller 21. This renders it possible to exchange the impellers, i.e., to readily replace an impeller 21 with an impeller 23 or vice versa. Such exchanges or replacements can be carried out while the remaining parts of the compressor 15 and/or the casing 19 can remain unchanged.

It is also possible to design the improved laser in such a way that the quotient of the axial length of the impeller 21 plus the axial length of the heat exchanger 14 and the axial length of an impeller 23 is a whole number. This, too, renders it possible to employ the casing and/or the compressor of the type disclosed in the copending German patent application Serial No. 38 01 481 in the laser of the present invention.

Still further, it is possible to select the quotient of the combined axial length of the impeller 21 plus the adjacent distancing member 28 and the combined axial length of an impeller 23 plus the adjacent distancing member 28 in such a way that the quotient is a whole number. This, too, renders it possible to employ, without any changes, a large number of parts which are used in a known apparatus in the laser of the present invention. This applies for the casing 19, impellers 21, 23 (the impellers 23 can be exchangeable with the impeller or impellers 21), washers, distancing members and/or many others. By standardizing the parts of the compressor 15 and/or of the heat exchanger 14 and/or 16, one can achieve considerable savings in initial and maintanance cost of the improved laser.

The laser of the present invention can be modified in a number of additional ways. For example, the illustrated compressor 15 can be replaced with a single-stage compressor or with a compressor having more than two stages. In addition, the turbine 13 can be replaced with a turbine having two or more impellers. This turbine can be designed to constitute a constant-pressure turbine or a reaction turbine. Still further, the entire casing for the compressor 15 or for an equivalent compressor can be provided with a cooling system, e.g., a cooling system which employs water or another liquid coolant. The conduits 12 can deliver heated gas radially or axially of the turbine. In addition, vanes can be provided on one or more distancing members 28 which are provided next to the impellers 23 of the compressor 15.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A flowing gas laser comprising:
    gas discharge means through which the gas flows including at least one resonator having an inlet for admission of cooled gas and an outlet for energy-bearing heated gas;
    gas confining means defining at least one path for the flow of gas from said gas discharge means outlet to said inlet;
    a turbine provided in said confining means receiving the energy bearing heated gas and comprising at least one rotary impeller driven by the cooling and expansion of the energy-bearing gas; and
    a compressor located in said confining means downstream of said turbine driven at least in part by said at least one impeller of said turbine to compress the cooled gas.

2. The laser of claim 1, wherein said compressor comprises a radial blower having a rotor with at least one impeller and further comprising means for transmitting the torque from said at least one impeller of said turbine to said rotor of said radial blower.

3. The laser of claim 1, further comprising at least one heat exchanger provided in said confining means to exchange heat with the gas.

4. The laser of claim 1, wherein said confining means comprises at least one conduit arranged to convey heated gas from said gas discharge means outlet to said turbine.

5. The laser of claim 4, wherein said gas discharge means includes n resonators and said confining means includes m conduits, with m being equal to or less than n.

6. The laser of claim 4, wherein said outlet has a first cross-sectional area and said at least one conduit has a second cross-sectional area at most matching said first cross-sectional area.

7. The laser of claim 6, wherein said first and second cross-sectional areas are substantially circular.

8. The laser of claim 4, wherein said outlet has a first cross-sectional area and said at least one conduit includes at least one portion having a second cross-sectional area which decreases in the direction of flow of heated gas from said outlet toward said inlet, said second cross-sectional area including a largest portion and a smallest portion and said largest portion at most matching said first cross-sectional area.

9. The laser of claim 4, wherein said at least one conduit defines an at least substantially straight portion of said at least one path defined by said gas confining means.

10. The laser of claim 4, wherein said confining means further comprises at least one gas accelerating nozzle between said at least one conduit and said at least one impeller of said turbine.

11. The laser of claim 4, wherein said confining means comprises a plurality of conduits and an annulus of gas accelerating nozzles disposed between said conduits and said at least one impeller of said turbine.

12. The laser of claim 4, wherein said at least one impeller of said turbine is rotatable about a predetermined axis and said at least one conduit discharges the energy bearing heated gas from said gas discharge means to said turbine through an end having an axis which is parallel to said turbine predetermined axis.

13. The laser of claim 4, wherein said at least one impeller of said turbine is rotatable about a predetermined axis and said at least one conduit discharges the energy bearing heated gas from said gas discharge means to said turbine through an end having an axis which is disposed at least substantially radially of said turbine predetermined axis.

14. The laser of claim 1, wherein said turbine is a constant-pressure turbine.

15. The laser of claim 1, wherein said turbine is a reaction turbine.

16. The laser of claim 1, wherein said compressor comprises a radial blower having at least one rotary impeller which is coaxial with said at least one impeller of said turbine.

17. The laser of claim 1, wherein said compressor comprises at least one rotary impeller and further comprising a heat exchanger provided in said confining means between said at least one impeller of said turbine and said at least one impeller of said compressor.

18. The laser of claim 17, wherein said compressor comprises a radial blower having a plurality of impellers including a first impeller, said heat exchanger comprising a diffusor between said at least one impeller of said turbine and said first impeller of said blower.

19. The laser of claim 1, wherein said confining means includes a casing for said compressor, said at least one impeller of said turbine being disposed in said casing.

20. The laser of claim 1, further comprising a heat exchanger in said at least one path between said turbine and said compressor, said compressor having a casing and said heat exchanger being disposed in said casing.

21. The laser of claim 1, further comprising a heat exchanger provided in said at least one path to exchange heat with the gas between said turbine and said compressor, said heat exchanger including at least one substantially frustoconical gas guiding element which diverges in the direction of gas flow from said turbine toward said compressor.

22. The laser of claim 21, wherein said heat exchanger includes a succession of gas guiding elements and at least one pipe for circulation of a liquid coolant, said pipe connecting said gas guiding elements with each other.

23. The laser of claim 1, further comprising a heat exchanger provided in said at least one path between said turbine and said compressor, said heat exchanger comprising a diffusor having a plurality of sections.

24. The laser of claim 23, wherein there are two said sections.

25. The laser of claim 1, wherein said confining means comprises a casing for said compressor and at least one conduit connecting said outlet with said casing, and further comprising a thermal insulator for said at least one conduit.

26. The laser of claim 1, wherein said confining means comprises at least one conduit disposed between said outlet and said turbine, and further comprising a heat exchanger provided in said at least one path between said turbine and said compressor, said turbine including a wall adjacent said heat exchanger and further comprising at least one layer of thermal insulating material between said wall and said heat exchanger.

27. The laser of claim 1, wherein said confining means comprises at least one conduit disposed between said outlet and said turbine and including a nozzle arranged to accelerate the gas in a direction toward the at least one impeller of said turbine, and further comprising a heat exchanger disposed in said at least one path adjacent said nozzle and at least one layer of thermal insulating material between said nozzle and said heat exchanger.

28. The laser of claim 1, wherein said confining means comprises a casing for said compressor, and further comprising a heat exchanger disposed in said at least one path adjacent said compressor and a liquid-containing cooling unit for said casing adjacent said heat exchanger.

29. The laser of claim 1, wherein said confining means comprises a casing for said compressor and said compressor comprises a rotor having at least two stages, and further comprising a liquid-containing cooling unit for said casing between said stages.

30. The laser of claim 1, wherein said confining means comprises a casing for said compressor and further comprising a heat exchanger provided in said at least one path between said turbine and said compressor and having a plurality of gas guiding elements and at least one pipe for circulation of a liquid coolant, said at least one pipe connecting said elements to each other and further comprising a liquid-containing cooling unit for said casing, said cooling unit being connected with said at least one pipe.

31. The laser of claim 1, wherein said turbine further comprises a rotary shaft for said at least one impeller, said compressor including a rotor which is coaxial with and is driven by said shaft and further comprising heat insulating members provided on said shaft, said at least one impeller being disposed between said heat insulating members.

32. The laser of claim 31, wherein at least one of said heat insulating members contains a ceramic material.

33. The laser of claim 1, wherein said confining means comprises a casing and said turbine comprises a rotary shaft for said at least one impeller and a bearing for said shaft, said bearing being installed in said casing adjacent said turbine and further comprising means for admitting fresh gas into said at least one path in the region of said bearing.

34. The laser of claim 33, wherein said compressor comprises a radial blower in said casing and said blower includes a rotor coaxial with and driven by said shaft.

35. The laser of claim 1, wherein said confining means comprises a casing for said turbine and said compressor, said compressor including a blower having a rotor and said turbine further comprising a shaft coaxial with and receiving torque from said at least one impeller and coaxial with and transmitting torque to said rotor, and further comprising a first bearing for said shaft provided in said casing adjacent said turbine, a second bearing provided for said shaft adjacent said blower, means for admitting fresh gas into said at least one path adjacent said first bearing, means for evacuating some gas from said at least one path at said second bearing, and conduit means connecting said evacuating means with said admitting means.

36. The laser of claim 35, further comprising at least one gas filter in said conduit means.

37. The laser of claim 35, further comprising means for cooling the gas in said conduit means.

38. The laser of claim 35, further comprising means for cleaning the gas in said conduit means.

39. The laser of claim 35, further comprising at least one flow restrictor for gas in said conduit means.

40. The laser of claim 1, further comprising a heat exchanger provided in said at least one path between said compressor and said inlet.

41. The laser of claim 40, wherein said compressor comprises a radial blower having a rotor and said heat exchanger comprises a plurality of annular heat exchanging elements coaxial with said rotor.

42. The laser of claim 41, wherein said confining means includes a casing for said blower and said casing has a discharge end adjacent said heat exchanging elements.

43. The laser of claim 1, wherein said gas discharge means comprises n resonators each having an inlet and an outlet, said confining means comprises a casing for said compressor and m conduits connecting said casing with the inlets of said resonators, and m is less than or equal to n.

44. The laser of claim 43, wherein said compressor comprises at least one impeller which is rotatable about a predetermined axis, said conduits having portions adjacent said casing and disposed at least substantially radially of said axis.

45. The laser of claim 43, wherein said compressor comprises at least one impeller which is rotatable about a predetermined axis, said conduits having portions adjacent said casing and being at least substantially parallel to said axis.

46. The laser of claim 1, wherein said compressor comprises at least one rotary impeller having a first diameter, said at least one rotary impeller of said turbine having a second diameter smaller than said first diameter.

47. The laser of claim 1, wherein said confining means includes a portion which connects said outlet with said turbine and is constructed and arranged to offer little resistance to the flow of gas from said at least one resonator to said turbine.

48. The laser of claim 1, wherein said turbine further includes a shaft which is coaxial with and is driven by said at least one impeller, said compressor including a rotor having at least one impeller which is coaxial with and is driven by said shaft, said at least one impeller of said turbine having a first axial length and said at least one impeller of said rotor having a second axial length which at least approximates said first axial length.

49. The laser of claim 1, wherein said turbine further comprises a shaft which is coaxial with and is driven by said at least one impeller, said compressor comprising a rotor having at least one impeller which is coaxial with and is driven by said shaft, and further comprising a heat exchanger disposed between said at least one impeller of said turbine and said at least one impeller of said rotor, the quotient of the combined axial length of said heat exchanger plus the at least one impeller of said turbine and the axial length of said at least one impeller of said rotor being a whole number.

50. The laser of claim 1, wherein said compressor comprises a rotor having at least one rotary impeller coaxial with said at least one impeller of said turbine, and further comprising a first distancing member adjacent said at least one impeller of said turbine and a second distancing member adjacent said at least one impeller of said rotor, the quotient of combined axial length of said at least one impeller of said turbine plus said first distancing member and the combined axial length of said second distancing member plus said at least one impeller of said rotor being a whole number.

* * * * *